United States Patent Office 3,168,481
Patented Feb. 2, 1965

3,168,481
REMOVAL OF NICKEL AND VANADIUM FROM SILICA-BASED CRACKING CATALYSTS
Henry Erickson, Park Forest, Ill., assignor, by mesne assignments, to Sinclair Research, Inc., New York, N.Y., a corporation of Delaware
No Drawing. Filed June 30, 1960, Ser. No. 39,810
19 Claims. (Cl. 252—412)

This invention concerns the removal of vanadium from a synthetic gel hydrocarbon conversion catalyst which has been contaminated with vanadium by use in the high temperature catalytic conversion of feedstocks containing vanadium. The invention may be used alone or as part of an overall metals-removal procedure employing a plurality of processing steps to increase the amount of vanadium or other metal contaminants removed by the procedure.

The invention comprises washing the contaminated catalyst with an aqueous solution containing ammonium ions and having a basic pH for a time sufficient to remove the available vanadium. The effectiveness of the ammonium wash may be significantly increased by subjecting the catalyst, after conventional regeneration, to treatment with a gas containing molecular oxygen at an elevated temperature before washing with the basic aqueous solution containing ammonium ions. In this preliminary treatment essentially carbon-free catalyst is contacted with the oxygen-containing gas for a time to convert a significant amount of the vanadium on the catalyst to a higher valence state, and other processing steps may intervene between the oxygen treatment and the ammonium wash. Copending patent applications Serial Nos. 763,834, filed September 29, 1958, now abandoned; 842,618, filed September 28, 1959, now abandoned; 849,199, filed October 28, 1959, now forfeited; and 19,313, filed April 1, 1960, now abandoned, describe procedures by which vanadium and other poisoning metals included in a solid oxide hydrocarbon conversion catalyst are removed by subjecting the catalyst, outside the hydrocarbon conversion system, to elevated temperature conditions which put the metal contaminants into the chloride, sulfate or other water-soluble or more available form. This invention provides for greater vanadium removal when practiced in conjunction with these and other procedures. This application is a continuation-in-part of application Serial No. 767,794, filed October 17, 1958, now abandoned.

Catalytically promoted methods for the chemical conversion of hydrocarbons include cracking, hydrocracking, reforming, hydroforming, coking, deasphalting, etc. Such reactions generally are performed at elevated temperatures, for example, about 300 to 1200° F., more often 600 to 1000° F. Feedstocks to these processes comprise normally liquid and solid hydrocarbons which at the temperature of the conversion reaction are generally in the fluid, i.e., liquid or vapor, state and the products of the conversion frequently are lower-boiling materials.

In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750 to 1100° F., preferably about 850 to 950° F., at pressures up to about 2000 p.s.i.g., preferably about atmospheric to 100 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

Solid oxide catalysts have long been recognized as useful in catalytically promoting conversion of hydrocarbons. For cracking processes, the catalysts which have received the widest acceptance today are usually activated or calcined predominantly silica or silica-based, e.g., silica-alumina, silica-magnesia, silica-zirconia, etc., compositions in a state of slight hydration and containing small amounts of acidic oxide promoters in many instances. The oxide catalyst may be alumina- or silica-based and ordinarily contains a substantial amount of a gel or gelatinous precipitate comprising a major portion of silica and at least one other material, such as alumina, zirconia, etc. These oxides may also contain small amounts of other inorganic materials, but current practice in catalytic cracking leans more toward the exclusion from the silica hydrate materials of foreign constituents such as alkaline metal salts which may cause sintering of the catalyst surface on regeneration and a drop in catalytic activity. For this reason, the use of wholly or partially synthetic gel catalysts, which are more uniform and less damaged by high temperatures in treatment and regeneration, is often preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material; for example it may be made by the precipitation of silica-alumina on clay, such as kaolinite or halloysite. One such semisynthetic catalyst contains about equal amounts of silica-alumina gel and clay.

The manufacture of synthetic gel catalysts can be performed, for instance (1) by impregnating silica with alumina salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by a combination of hydrated silica with other hydrate bases as, for instance, zirconia, etc. These synthetic gel-type catalysts are activated or calcined before use.

The physical form of the catalyst varies with the type of manipulative process to which it will be exposed. In a fixed-bed process, a series of catalytic reactors may be used, some being on stream and others in the process of cleaning, regeneration, etc. In circulating catalyst systems, such as those of the fluid catalytic and "TCC" processes, catalyst moves through a reaction zone and then through a regeneration zone. In the fluid process, gases are used to convey the catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns. In the "TCC" or "Thermofor" process the catalyst is in the form of beads which are conveyed by elevators. Generally these beads may range in size up to about ½" in diameter. When fresh, the minimum sized bead is generally about ⅛". Other types of process use other forms of catalyst such as tablets or extruded pellets.

One of the most important phases of study in the improvement of catalyst performance in hydrocarbon conversion is in the area of metals poisoning. Although referred to as "metals," these catalyst contaminants may be in the form of free metals or relatively non-volatile metal compounds. It is to be understood that the term "metal" used herein refers to either form.

Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. Thus Venezuelan crudes or their fractions make ideal feeds for my present process when the demetallization is essentially just the ammonium wash, and especially when the regenerated catalyst is treated with an oxygen-containing gas at a high temperature prior to the ammonium wash. In addition to metals naturally present, including some iron, petroleum stocks have a tendency to pick up tramp iron from transportation, storage and processing equipment. Most of these metals, when present in a stock, deposit in a relatively non-volatile form on the catalyst during the conversion processes so that regeneration of the catalyst to remove coke does not remove these contaminants.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate. A poisoned catalyst generally produces a higher yield of coke and hydrogen at the expense of desired products, such as gasoline and butanes. For instance, it has been shown that the yield of gasoline, based on cracking feed disappearance to lighter materials dropped from 93 to 82% when the laboratory-measured coke factor of a catalyst rose from 1.0 to 3.0 in commercial cracking of a feedstock containing some highly contaminated stocks. Since many cracking units are limited by coke burning or gas handling facilities, increased coke or gas yields require a reduction in conversion or throughput to stay within the unit capacity.

An alternative to letting catalyst metals level increase and activity decrease is to diminish the overall metal content by raising catalyst replacement rates. Either approach, letting metals level increase, or increasing catalyst replacement rates, must be balanced against product value and operating costs to determine the most economic way of operating. The optimum metal level at which to operate any cracking unit will be a function of many factors including feedstock metal content, type and cost of catalyst, overall refinery balance, etc., and can be determined by a comprehensive study of the refinery's operations.

A further alternative, demetallizing the catalyst, which avoids discharging of expensive catalyst and enables much lower grade, highly metals-contaminated feedstocks to be used, is now possible in this invention. In my process a catalyst contaminated with vanadium by use in converting a vanadium-containing petroleum feedstock may be treated only for vanadium removal, or the catalyst may be treated for nickel and/or iron removal as well.

Commercially used cracking catalysts are the result of years of study and research into the nature of cracking catalysis, and the cost of these catalysts is not negligible. The cost frequently makes highly poisoned feedstocks less desirable to use in cracking operations even though they may be in plentiful supply, because of their tendency to damage the expensive catalysts. The expense of such catalysts, however, is justified because the composition, structure, porosity and other characteristics of such catalysts are rigidly controlled so that they may give optimum results in cracking. It is important, therefore, that removing poisoning metals from the catalysts does not jeopardize the desired chemical and physical constitution of the catalyst. Although methods have been suggested in the past for removing poisoning metals from a catalyst which has been used for high temperature hydrocarbon conversions, for example, the processes of U.S. Patents 2,488,718; 2,488,744; 2,668,798 and 2,693,455, the process of this invention is effective to remove vanadium and other metals without endangering the expensive catalyst.

In this invention the hydrocarbon petroleum oils utilized as feedstock for a conversion process may be of any desired type normally utilized in catalytic conversion operations. This feedstock contains vanadium sometimes as much as 3%, and the catalyst may be used as a fixed, moving or fluidized bed or may be in a more dispersed state. For typical operations, the catalytic cracking of the hydrocarbon feed would normally result in a conversion of about 50 to 60% of the feedstock into a product boiling in the gasoline boiling range. The catalytic conversion system also includes a regeneration procedure in which the catalyst is contacted periodically with free oxygen-containing gas in order to restore or maintain the activity of the catalyst by removing carbon. It will be understood that in this specification and claims "regeneration" refers to this carbon burn-off procedure.

Vanadium is removed from the catalyst by washing it with a basic aqueous solution. The pH is frequently greater than about 7.5 and the solution contains ammonium ions. The solution should be substantially free, before contact with the catalyst, of any contaminant materials which would remain deposited on the catalyst. Such contaminant materials include the alkali metals, as well as the heavy poisoning metals. The ammonium ions may be $NH_4^+$ ions or organic-substituted $NH_4^+$ ions such as methyl ammonium and quaternary hydrocarbon radical ammoniums. The aqueous wash solution can be prepared by addition of a dry reagent or a concentrated solution of the reagent to water, preferably distilled or deionized water. Ammonia or methylamine gas may be dissolved directly in water.

The reagent may be any water-soluble organic or inorganic ammonium compound such as ammonium carbonate, methylamine, etc. and the solution is basic. An aqueous solution of ammonium hydroxide is highly preferred. The selected solute will be one which dissociates or ionizes in the aqueous solution and which can be washed away or which vaporizes or decomposes to vaporizable materials under catalyst regeneration or similar high temperature treatment. Acidic solutions, e.g., those of the ammonium salts of acids such as nitric and acetic are to to be avoided. Even ammonium or amine compounds of limited water solubility are usable in this invention due to the small concentration of ammonium ion needed. The preferred solutions have a pH of about 8 to 11.

The amount of ammonium ion in the solution is sufficient to give the desired vanadium removal and will often be in the range of about 1 to 25 or more pounds per ton of catalyst treated. Five to fifteen pounds is the preferred ammonium range but the use of more than about 10 pounds does not appear to increase vanadium removal unless it increases pH. The temperature of the wash solution does not appear to be significant in the amount of vanadium removed, but may vary within wide limits. The solution may be at room temperature or below, or may be higher. Temperatures above 215° F. require pressurized equipment, the cost of which does not appear to be justified. The temperature, of sourse, should not be so high and the contact should not be so long as to seriously harm the catalyst. The time of contact also may vary within wide limits, so long as thorough contact between the catalyst and the wash solution is assured. Very short contact times, for example, about a minute, are satisfactory, while the time of washing may last 2 to 5 hours or longer.

After the ammonium wash the catalyst slurry can be filtered to give a cake which may be reslurried with water or rinsed in other ways, such as, for example, by a water wash on the filter, and the rinsing may be repeated, if desired, several times. A repetition of the ammonium wash without other treatments seems to have little effect on vanadium removal if the first washing has been properly conducted. However, repetition of the basic aqueous ammonium wash after, for example, the high temperature oxygen treatment described below, does serve to further diminish the vanadium content of the catalyst.

After the ammonium wash, or after the final treatment which may be used in the catalyst demetallization procedure, the catalyst is conducted to its conversion system, for instance to the catalyst regenerator, although it may be desirable first to dry the catalyst filter cake or filter cake slurry at say about 250 to 450° F. and also, prior to reusing the catalyst in the conversion operation it can be calcined, say at temperatures usually in the range of about 700 to 1300° F.

The process of this invention produces significantly greater removal of vanadium when, upon removal of the vanadium-poisoned catalyst from the conversion system, it is regenerated, given a treatment at elevated temperatures with molecular oxygen-containing gas, and washed with the aqueous solution containing ammonium ions before returning the catalyst to the hydrocarbon conversion system. Ordinarily, the catalysts are treated before the poisoning metals have reached an undesirably high level, for instance, about 2%, generally no more than about 1% maximum, content of vanadium. Prior to oxygen treatment, subjecting the poisoned catalyst sample to magnetic flux may be found desirable to remove any tramp iron particles which may have become mixed with the catalyst. When oxygen treatment is employed in the process of this invention, the regeneration of any particular quantum of catalyst is generally continued until the carbon content is less than about 0.5%.

Treatment of the regenerated catalyst with molecular oxygen-containing gas is described in copending application Serial No. 19,313, filed April 1, 1960, hereby incorporated by reference. The temperature of this treatment is generally in the range of about 1000 to 1800° F. but below a temperature where the catalyst undergoes any substantial deleterious change in its physical or chemical characteristics. The catalyst is in a substantially carbon-free condition during this high-temperature treatment. If any significant amount of carbon is present in the catalyst at the start of this high-temperature treatment, the essential oxygen contact is that continued after carbon removal. In any event, after carbon removal, the oxygen treatment of the essentially carbon-free catalyst is at least long enough to convert a substantial amount of vanadium to a higher valence state, as evidenced by a significant increase, say at least about 10%, preferably at least about 100%, in the vanadium removal in subsequent stages of the process. This increase is over and above that which would have been obtained by the other metals removal steps without the oxygen treatment.

The treatment of the vanadium-poisoned catalyst with molecular oxygen-containing gas prior to the ammonium wash is preferably performed at a temperature of about 1150 to 1350 or even as high at 1600° F. Little or no effect on vanadium removal is accomplished by treatment at temperatures significantly below about 1000° F., even for an extended time. The upper temperature, to avoid undue catalyst damage, will usually not materially exceed about 1600 or 1800° F. The duration of the oxygen treatment and the amount of vanadium prepared by the treatment for subsequent removal is dependent upon the temperature and the characteristics of the equipment used. The length of the oxygen treatment may vary from the short time necessary to produce an observable effect in the later treatment to a time just long enough not to damage the catalyst. In a relatively static apparatus such as a muffle furnace, the effectiveness of the treatment can increase with the time over a rather extended period; in other types of apparatus, however, such as a flow reactor, where there is more thorough contact of catalyst and gas, little increase in effectiveness was observed after about four hours of treatment.

The oxygen-containing gas used in the treatment contains molecular oxygen as the essential active ingredient. The gas may be oxygen, or a mixture of oxygen with inert gas, such as air or oxygen-enriched air. The partial pressure of oxygen in the treating gas may range widely, for example, from about 0.1 to 30 atmospheres, but usually the total gas pressure will not exceed about 25 atmospheres. As the oxygen partial pressure increases the time needed to increase the valence of a given amount of vanadium in general decreases. The factors of time, partial pressure and extent of vanadium conversion may be chosen with a view to the most economically feasible set of conditions. It is preferred to continue the oxygen treatment for at least about 15 or 30 minutes with a gas containing at least about 1%, preferably at least about 10% oxygen.

The catalyst may pass directly from the oxygen treatment to the ammonia wash for satisfactory vanadium removal especially where this is the only important contaminant, as may be the case when a feed is derived, for example, from Venezuelan crude. However, the removal of other metal poisons and vanadium from the catalyst may be improved by employing other procedures prior to the ammonium wash, and preferably after the treatment with an oxygen-containing gas. These procedures include conversion of the contaminating metals to a form soluble in an aqueous medium, e.g., water or dilute acid. The metal contaminant may be converted, for instance, to an inorganic, water-soluble or volatile metal salt which may contain some of the vanadium or other metals in the cation or anion, or the salt may be a water-soluble or volatile complex of a normally insoluble or non-volatile form of the metal contaminant. Also, the water-soluble form may be one which decomposes in water to produce water-soluble products. The removal procedure for the converted metal may be based on the form to which the metal is converted. The mechanism of the ammonium washing step of this invention may be one of simultaneous conversion of vanadium to salt form and removal by the aqueous ammonium wash; however, this invention is not to be limited by such a theory.

As stated, the conversion of the contaminating metals is prior to the washing step and is preferably by means of a reactive gas treatment at an elevated temperature, that is, a temperature over about 300° F. Conversion of some of the metal poisons to the sulfate or other water-soluble salts is described in copending applications Serial No. 763,834, filed September 29, 1958, and Serial No. 842,618, filed September 28, 1959, and may be accomplished, for instance, by subjecting the catalyst to a sulfating gas, that is, $SO_2$, $SO_3$ or a mixture of $SO_2$ and $O_2$, at an elevated temperature. Sulfur oxide contact is usually performed at a temperature of about 500 to 1200° F. and frequently it is advantageous to include some free oxygen in the treating gas. Another procedure includes sulfiding the catalyst and converting the sulfide by an oxidation process, after which metal contaminants in water-soluble form, either prior to or simultaneously with the ammonium wash may be dissolved from the catalyst by an aqueous medium.

The sulfiding step can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 to 1500° F., preferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say, up to about 20 hours or more depending on these conditions and the severity of the poisoning. Temperatures of about 900 to 1200° F. and pressures approximating 1 atmosphere or less seem near optimum for sulfiding and this treatment often continues for at least 1 or 2 hours but the time, of course, can depend upon the manner of contacting the catalyst and sulfiding agent and the nature of the treating system, e.g., batch or continuous, as well as the rate of diffusion within the catalyst matrix.

The sulfiding step performs the function not only of supplying a sulfur-containing metal compound which may be easily converted to the sulfate or other water-soluble form but also serves to concentrate some metal poisons, especially nickel, at the surface of the catalyst particle. It is theorized that some metal poisons may be present in poisoned catalysts largely in solid solution in the catalyst matrix. The metal ions being mobile in solution at elevated temperatures, it has been found possible to concentrate the metals at the catalyst surface by treatment with a sulfiding agent, such as hydrogen sulfide at elevated temperatures. The sulfiding agent converts the metal ions at the surface to metal sulfides which seem less soluble in the matrix. Diffusion of metal ions transports additional metal to the surface where it is in turn converted to the sulfide. Thus a continuing process concentrates the metals as sulfides on the catalyst surface whence they are more readily susceptible to further treatment.

Oxidation after sulfiding may be performed by a gaseous oxidizing agent to convert metal sulfide to sulfate, including oxysulfate, or other water-soluble form. Gaseous oxygen, or mixtures of gaseous oxygen with inert gases such as nitrogen, may be brought into contact with the sulfided catalyst at an oxygen partial pressure of about 0.2 atmosphere and upward, temperatures upward of room temperature and usually not above about 1300° F., and times dependent on temperature and oxygen partial pressure. Gaseous oxidation is best carried out near 900° F., about one atmosphere $O_2$ and at very brief contact times.

The metal sulfide may be converted to the corresponding sufate, or other water-soluble form, by a liquid aqueous oxidizing agent such as a dilute hydrogen peroxide or hypochlorous acid water solution. Other oxidizing agents, such as sodium peroxide in acid solution, chromic acid where a small residual $Cr_2O_3$ content in the catalyst is not significant, and similar aqueous oxidizing solutions such as water solutions of manganates and permanganates, chlorites, chlorates and perchlorates, bromites, bromates and perbromates, iodites, iodates and periodates, are also useful. Bromine or iodine water, or aerated, ozonated or oxygenated water, with or without acid, also will oxidize the sulfides to sulfates. The inclusion in the liquid aqueous oxidizing solution of sulfuric acid or nitric acid has been found greatly to reduce the consumption of peroxide. In addition the inclusion of nitric acid in the oxidizing solution provides for increased vanadium removal. Useful proportions of acid to peroxide to catalyst generally include about 2 to 25 pounds acid (on a 100% basis) to about 1 to 30 pounds or more $H_2O_2$ (also on a 100% basis) in a very dilute aqueous solution, to about one ton of catalyst.

A 30% $H_2O_2$ solution in water seems to be an advantageous raw material for preparing the aqueous oxidizing solution. Sodium peroxide or potassium peroxide may be used in place of hydrogen peroxide and in such circumstances, enough extra sulfuric or nitric acid could be used to provide one mole of sulfate or two moles of nitrate for each two moles of sodium or potassium. Another highly advantageous oxidizing medium is an aerated dilute nitric acid solution in water. Such a solution may be provided by continuously bubbling air into a slurry of the catalyst in very dilute nitric acid. No difference in effect has been found when the rate of air introduction to an aqueous oxidizing solution is varied in the range of about ⅙ to 1 cubic foot per minute. Hence, this is not considered to be a controlling factor. Other oxygen-containing gases may be substituted for air. Also, varying oxygen partial pressure in the range of about 0.2 to 1.0 atmosphere appears to have no effect in shortening the time required for oxidation, which is generally at least about 7 to 8 minutes. The oxidation slurry may contain about 20% solids and provide about five pounds of nitric acid per ton of catalyst. Studies have shown a greater concentration of $HNO_3$ to be of no significant advantage. The liquid phase oxidation may also be performed by exposing the sulfided catalyst first to air and then to the aqueous nitric acid solution. The conditions of oxidation can be selected as desired. The temperature can conveniently range up to about 220° F. with temperatures of above about 150° F. being preferred. Temperatures above about 220° F. necessitate the use of superatmospheric pressures and no need for such has been found.

It has further been found that treatment of a metals contaminated catalyst with a chlorinating agent at a moderately elevated temperature is of value in removing vanadium and iron contaminants from the catalyst as volatile chlorides. This treatment is described in copending application Serial No. 849,199, filed October 28, 1959. Generally, the major proportion of these volatile chlorides is removed during contact with the chlorinating vapor and where the volatile chlorides are insufficiently removed, a purge with an inert gas such as nitrogen at an elevated temperature may be applied to the chlorinated catalyst. The non-acidic aqueous ammonium wash of this invention may be used, for instance, as a substitute or complement to such a purge.

A conversion to vanadium chloride after the high temperature oxygen and/or sulfiding treatment preferably makes use of vapor phase chlorination at a moderately elevated temperature wherein the catalyst composition and structure is not materially harmed by the treatment and a substantial amount of the poisoning metals content is converted to chlorides. The conversion to chloride may be performed after sulfiding the poisoning metals, as described above. The chlorination takes place at a temperature of at least about 300° F., preferably about 550 to 650° F., with optimum results being obtained close to about 600° F. The chlorinating reagent is a vapor which contains chlorine, preferably in combination with carbon or sulfur. Such reagents include molecular chlorine but preferably are the chlorine substituted light hydrocarbons, such as carbon tetrachloride, which may be used as such or formed in situ by the use of, for example, a vaporous mixture of chlorine gas with low molecular weight hydrocarbons such as methane, n-pentane, etc. The chlorination may take about 5 to 120 minutes, more usually about 20 to 60 minutes, but shorter or longer reaction periods may be possible or needed, for instance, depending on the linear velocity of the chlorinating and purging vapors. A fluidized solids technique is recommended for these vapor contact processes as a way to shorten the time requirements. After the available catalytically active poisoning metal has been removed, in any removal procedure, further reaction time has relatively little effect on the catalytic activity of the depoisoned catalyst, although further metals content may be removed by repeated or other treatments.

After the conversion of some of the poisoning metal, the catalyst can be washed with an aqueous medium, preferably distilled or deionized water, to remove metal sulfate, nitrate, etc. Frequently, this aqueous wash medium will be somewhat acidic, at least initially, due to the presence of the acid-acting salt or some entrained acidic oxidizing agent on the catalyst. Ambient temperatures can be used in the wash but temperatures of about 150° F. to the boiling point of water are helpful in increasing the solubility of the vanadium salts. Pressures above atmospheric may be used but the results usually do not justify the additional equipment. Where an aqueous oxidizing solution is used, the solution may perform part or all of the metal compound removal simultaneously with the oxidation. In order to avoid undue solution of alumina from the catalyst, contact time in this stage is preferably held to about 3 to 5 minutes which is sufficient for nickel removal. Also, since a slightly acidic solution is desirable for nickel removal, this wash preferably takes place before the ammonium wash.

The catalyst to be treated may be removed from the hydrocarbon conversion system—that is, the stream of catalyst which in most conventional procedures is cycled between conversion and regenerating operations—before the poison content reaches about 5000 to 10,000 p.p.m., the poisoning metals being calculated as their common oxides. Generally, at least about 250 or 500 p.p.m. vanadium will be accumulated on the catalyst before demetallization is warranted. A small portion of the catalyst is preferably removed from the hydrocarbon conversion system and given the oxygen treatment after the conventional oxidation regeneration which serves to remove carbonaceous deposits. The treatment of this invention is effective despite the presence of a small amount of carbon on the treated catalyst, but preferably the regeneration is continued until the catalyst contains not more than about 0.5% carbon before a subsequent oxygen treatment. Where the catalyst is subjected to the oxygen treatment before it is substantially carbon free, the length of oxygen treatment, as recited above, is reckoned from the time that the catalyst reaches the substantially carbon-free state, that is the state where little, if any, carbon is burned even when the catalyst is contacted with oxygen at temperatures conducive to combustion.

The amount of Ni, V or Fe removed in practicing the procedures outlined or the proportions of each which are removed may be varied by proper choice of treating conditions. It may prove necessary, in the case of very severely poisoned catalysts, to repeat the treatment to reduce the metals to an acceptable level, perhaps with variations where one metal is greatly in excess. A further significant advantage of the process lies in the fact that the overall metals removal operation, even if repeated, does not unduly deleteriously affect the activity, selectivity, pore structure and other desirable characteristics of the catalyst.

In practice the process could be applied in a refinery by removing a portion of catalyst from the regenerator or regenerator standpipe of the cracking system after a standard regeneration treatment to remove a good part of the carbon, heating this portion of the catalyst inventory in air to the temperature and for the length of time found to be sufficient for vanadium removal without catalyst damage, then slurrying the catalyst in the ammonium ion-containing solution. The treated catalyst can be returned to the unit, for example, to the regenerator, reducing greatly the new catalyst requirement.

EXAMPLES

A "Nalcat" synthetic gel silica-alumina finely divided fluid-type cracking catalyst composed of about 25% $Al_2O_3$, substantially the rest $SiO_2$, was used in a commercial catalytic cracking conversion unit, using conventional fluidized catalyst techniques, including cracking and air regeneration to convert a feedstock (A) comprising, a blend of Wyoming and Mid-Continent gas oils containing about 1.2 p.p.m. vanadium and about 2 weight percent sulfur. This gas oil blend had a gravity (API) of 24°, a carbon residue of about 0.3 weight percent and a boiling range of about 500 to 1000° F. When this catalyst had a vanadium content of 4220 p.p.m., measured as $V_2O_5$, a sample was removed from the cracking system after regeneration. A batch of this base catalyst sample, subjected to magnetic flux for iron removal, was used to test-crack a petroleum hydrocarbon East Texas gas oil fraction (feedstock B) having the following approximate characteristics.

| | |
|---|---|
| IBP (° F.) | 490–510 |
| 10% | 530–550 |
| 50% | 580–600 |
| 90% | 650–670 |
| EP | 690–710 |
| Gravity (API) degrees | 33–35 |
| Viscosity (SUS) at 100° F. | 40–45 |
| Aniline point ° F. | 170–175 |
| Pour point ° F. | 35–40 |
| Sulfur percent | 0.3 |

The results of this cracking are given in Table II below.

The rest of the catalyst sample was divided into several parts, each of which was given an ammonium wash under the conditions described in Table I. This wash was preceded, except in the case of sample 57, by a treatment with air in a muffle furnace, the conditions of which are also given in Table I.

*Table I*

| Sample | Base Cat. | 57 | 62 | 66 | 67 | 24 | 32 | 43 | 44 | 33 | 22 | 23 |
|---|---|---|---|---|---|---|---|---|---|---|---|---|
| Air treatment: | | | | | | | | | | | | |
| Time | | | 4 | 4 | 4 | 1 | 1 | 1 | 1 | 1 | 1 | 1 |
| Temp. (° F.) | | | 1,000 | 1,300 | 1,400 | 1,500 | 1,500 | 1,500 | 1,500 | 1,500 | 1,500 | 1,500 |
| $NH_4^+$ Wash: | | | | | | | | | | | | |
| Lbs. $NH_3$/ton catalyst | | 20 | 20 | 20 | 20 | 20 | 20 | 20 | 20 | 20 | 20 | 20 |
| Time (minutes) | | 30 | 30 | 30 | 30 | 30 | 30 | 60 | 5 | 30 | 30 | 40 |
| Temp. (° F.) | | 212 | 212 | 212 | 212 | 212 | 105 | 212 | 212 | 212 | 212 | 212 |
| $V_2O_5$ Content | 4,220 | 3,872 | 3,692 | 2,733 | 2,285 | 1,714 | 1,657 | 1,609 | 1,499 | 2,035 | 1,719 | 1,719 |
| Percent $V_2O_5$ Removed | | 8.3 | 12.5 | 35.2 | 45.9 | 59.4 | 60.8 | 61.9 | 63.5 | 51.9 | 59.2 | 59.2 |

It will be observed from the data reported in Table I that treatment of the catalyst with the dilute basic ammonium wash is effective for vanadium removal and that this process is made more effective by prior treatment with the oxygen-containing gas especially at a temperature of over about 1200° F. Samples 24 and 32 show the negligible differences in vanadium removal due to change in wash temperature, while samples 32, 43 and 44 show the minor differences stemming from the length of the time of the ammonium wash, although tending to favor short contact times. Samples 33, 22, 24 and 23 show the lack of effect of an ammonia concentration of more than 10 pounds per ton of catalyst.

Another batch of the base catalyst was treated with air for one hour at 1500° F. and then treated with dilute ammonia water containing 20 pounds $NH_3$ per ton of catalyst for 30 minutes at 212° F. A portion of this treated batch was sent to test-cracking of feedstock B with the results reported in Table II, while the remaining catalyst of the batch was subjected to a repeated air-ammonium wash treatment. A portion of the treated catalyst was used for test-cracking of feedstock B while the remainder was against treated with air and ammonia water as before and again divided, etc. Table II reports the results of these repeated treatments on vanadium removal and cracking results.

Table II

| Sample | Base Cat. | 16 | 20 | 29 | 37 |
|---|---|---|---|---|---|
| No. of treatments | None | 1 | 2 | 3 | 4 |
| $V_2O_5$ Content | 4,220 | 1,547 | 1,231 | 1,028 | 962 |
| Percent of Residual $V_2O_5$ Removed | | 63.4 | 20.4 | 16.5 | 6.4 |
| Cumulative Percent $V_2O_5$ Removed | | 63.4 | 70.8 | 75.5 | 77.1 |
| Cracking Results: | | | | | |
| Percent Gasoline | 22.7 | 24.2 | 25.3 | 25.0 | 24.6 |
| Percent Gas | 15.6 | 16.3 | 15.5 | 17.3 | 18.8 |
| Percent Coke | 3.2 | 3.1 | 3.0 | 3.0 | 3.7 |
| Percent Conversion | 41.5 | 43.6 | 43.8 | 45.3 | 47.1 |
| Gas Gravity | 1.02 | 1.21 | 1.20 | 1.28 | 1.27 |
| Relative Activity | 34.8 | 39.3 | 39.4 | 43.0 | 46.8 |
| Distillate+Loss | 33.1 | 35.5 | 35.5 | 37.2 | 38.8 |
| Gas Factor | 1.68 | 1.35 | 1.28 | 1.26 | 1.27 |
| Coke Factor | 1.28 | 1.12 | 1.07 | 0.99 | 1.10 |

These results show the vanadium removal attainable by repeated treatments and also show the remarkably beneficial effects of vanadium removal from the catalyst on cracking results. It is noteworthy that percent conversion and relative activity of the cracking increase steadily with further removal of vanadium poisons from the catalyst.

A six hundred gram sample of the equilibrium base catalyst was exposed to air in a muffle furnace for 2 hours at 1300° F. One third (200 g.) of the treated catalyst was slurried 5 minutes in 800 ml. of a solution containing $NH_4OH$ equivalent to 10 lbs. $NH_3$ per ton of catalyst, washed, dried and calcined. The resulting $V_2O_5$ removal is shown in sample 30, Table III, below. A second 200 g. sample (31) of the calcined catalyst was washed onto an 81 mm. diameter fritted Pyrex filter and drained, forming a filter cake 65 mm. thick. The cake was flooded with 175 ml. 72° F. solution of $NH_4OH$ equivalent to 10 lbs. $NH_3$ per ton of catalyst, let stand 5 minutes, drained, washed, etc. A third sample (32) was treated in the same manner as was 31 except that the $NH_4OH$ solution was heated to 180° F., cooling to 141° F. during the soaking interval.

Table III

| Sample No. | 30 | 31 | 32 |
|---|---|---|---|
| Leaching Method | Slurry | Displacement | Displacement |
| Leaching Temp., °F | 180 | 72 | 180/141 |
| Vol. Leach Sol'n., ml | 800 | 175 | 175 |
| Lbs., $NH_3$/ton catalyst | 10 | 10 | 10 |
| Molarity $NH_4OH$ Sol'n | 0.071 | 0.336 | 0.336 |
| P.p.m. $V_2O_5$ | 2,971 | 3,050 | 3,070 |
| Percent $V_2O_5$ Removal | 33.9 | 32.2 | 31.7 |

To determine the effect of conversion to a soluble salt between the initial oxygen gas treatment and the ammonium wash, a sulfiding-oxidation procedure was performed as follows: A 600 gram sample of the base poisoned catalyst was air treated for 2 hours at 1300° F., sulfided for 1 hour with $H_2S$ at 1150° F. and oxidized with an $HNO_3$ aqueous solution through which air was bubbled. The filter cake from the $HNO_3$ treatment was divided into 3 equal parts. The first portion (51) was washed on the filter with 1 liter of 72° F. water, slurried 10 minutes in 1 liter 180° F. water, filtered and again washed with 1 liter 72° F. water on the filter. The filter cake was slurried 10 minutes at 180° F. in 800 ml. $NH_4OH$ solution, washed in the manner described, dried and calcined. The second portion (52) was washed on the filter with 3 liters 72° F. water before and after the same type of $NH_4OH$ leaching as above. The third sample was prepared in the same manner as was 52 except that the water used for displacement washing was preheated to 180° F. Results obtained are shown in Table IV below.

Table IV

| Sample No. | 51 | 52 | 53 |
|---|---|---|---|
| Washing: | | | |
| Method | Reslurry | Displacement | Displacement |
| Vol. Wash Water, ml. | 3,000 | 3,000 | 3,000 |
| Wash Temp., °F | 72/180/72 | 72 | 180 |
| $NH_4OH$ Leach: | | | |
| Time, min | 10 | 10 | 10 |
| Temp., °F | 180 | 180 | 180 |
| Lbs. $NH_3$/ton Catalyst | 10 | 10 | 10 |
| Analysis: | | | |
| P.p.m. Fe | 2,100 | 2,080 | 2,045 |
| P.p.m. NiO | 137 | 139 | 137 |
| P.p.m. $V_2O_5$ | 3,265 | 3,345 | 3,287 |
| Percent Metals Removal: | | | |
| Fe | 22.6 | 23.4 | 24.8 |
| NiO | 60.5 | 59.9 | 60.5 |
| $V_2O_5$ | 27.3 | 25.6 | 26.8 |
| Test Cracking: | | | |
| Relative Activity | 47.6 | 45.7 | 47.2 |
| D+L | 39.1 | 38.5 | 39.0 |
| Gas Factor | 1.50 | 1.54 | 1.44 |
| Coke Factor | 1.20 | 1.24 | 1.22 |
| Gas Gravity | 1.13 | 1.10 | 1.16 |

When compared to data in Table III, the sulfiding and oxidation steps reduced the extent of $V_2O_5$ removal, while increasing the removal of other poisoning metals.

Samples 71 to 76 reported on in Table V below were portions of sample 66, reported in Table I, which were removed from sample 66 after the 4 hour air treatment at 1300° F. These samples were washed with ammonium ion-containing aqueous solutions of differing pH, brought about by the use of a different ammonium ion-producing solute in each solution. In each sample wash, solids comprised 20% of the slurry and the washing was conducted for 10 minutes at about 75° F. The amount of reagent reported is its equivalent weight as $NH_3$ in proportion to the total slurry.

Table V

| Sample | 71 | 72 | 73 | 74 | 75 | 76 |
|---|---|---|---|---|---|---|
| Reagent | $NH_4OH$ | $NH_4NO_3$ | $(NH_4)_2CO_3$ | $CH_3NH_2$ | $NH_4OH$ | $NH_4OAC$ |
| Wt. percent | 0.10 | 0.10 | 0.10 | 0.11 | 0.10 | 0.10 |
| pH of Slurry | 9.1 | 4.2 | 7.7 | 9.8 | 9.2 | 5.3 |
| Metals Analysis: | | | | | | |
| P.p.m. NiO | 301 | 310 | 311 | 282 | 289 | 284 |
| P.p.m. $V_2O_5$ | 3,483 | 4,217 | 3,846 | 3,365 | 3,528 | 4,081 |
| Percent Fe | 0.277 | 0.298 | 0.295 | 0.276 | 0.275 | 0.271 |
| Percent V removed | 19 | 2 | 111 | 22 | 18 | 6 |

It can be seen from these results that an alkaline pH is required for effective vanadium removal and that reagents which fail to supply the needed pH are not desirable.

It is claimed:

1. In a method for treating a synthetic gel, silica-based catalyst which has been poisoned by contamination with vanadium due to use of said catalyst in cracking at elevated temperature a hydrocarbon feedstock containing vanadium, said cracking including a catalytic cracking zone and a catalyst regeneration zone between which the catalyst is cycled and in which cracking zone the catalyst becomes contaminated with vanadium of said hydrocarbon feedstock and in which regeneration zone carbon is oxidized at an elevated temperature and thereby removed from the catalyst, the steps comprising bleeding a portion of the vanadium-contaminated catalyst from the cracking system, contacting bled catalyst with an aqueous solution having a basic pH and containing ammonium ions sufficient to remove vanadium from the catalyst, and returning resulting devanadized catalyst to the cracking system, said ammonium ions being provided in the aqueous solution by a member selected from the group consisting of ammonium hydroxide, ammonium carbonate and methylamine.

2. The method of claim 1 in which the catalyst is silica-alumina.

3. The method of claim 1 in which the aqueous solution has a pH of about 8 to 11.

4. The method of claim 3 in which the ammonium ions are supplied by $NH_4OH$.

5. The method of claim 4 in which the catalyst is silica-alumina.

6. In a method for treating a synthetic gel, silica-based catalyst which has been poisoned by contamination with vanadium due to use of said catalyst in cracking at elevated temperature a hydrocarbon feedstock containing vanadium, said cracking including a catalytic cracking zone and a catalyst regeneration zone between which the catalyst is cycled and in which cracking zone the catalyst becomes contaminated with vanadium of said hydrocarbon feedstock and in which regeneration zone carbon is oxidized at an elevated temperature and thereby removed from the catalyst, the steps comprising bleeding a portion of the vanadium-contaminated catalyst from the cracking system, contacting bled, substantially carbon-free catalyst for at least about 15 minutes with a gas containing molecular oxygen at a temperature of at least about 1000° F., but below a temperature deleterious to the catalyst to increase subsequent vanadium removal, contacting oxygen-treated catalyst with an aqueous solution having a basic pH and containing ammonium ions sufficient to remove vanadium from the catalyst and returning resulting devanadized catalyst to the cracking system, said ammonium ions being provided in the aqueous solution by a member selected from the group consisting of ammonium hydroxide, ammonium carbonate and methylamine.

7. The method of claim 6 in which the ammonium ions are supplied by ammonium hydroxide.

8. The method of claim 7 in which the contact with gas containing molecular oxygen is at about 1150 to 1600° F.

9. The method of claim 8 in which the catalyst is silica-alumina.

10. The method of claim 9 in which the contact with the basic aqueous solution is at a temperature below about 215° F., and the aqueous solution has a pH of about 8 to 11.

11. The method of claim 10 in which the contaminated catalyst contains less than about 2% vanadium.

12. In a method for treating a synthetic gel, silica-based catalyst which has been poisoned by contamination with a metal selected from the group consisting of nickel and vanadium due to use of said catalyst in cracking at elevated temperature a hydrocarbon feedstock containing said metal, said cracking including a catalytic cracking zone and a catalyst regeneration zone between which the catalyst is cycled and in which cracking zone the catalyst becomes contaminated with said metal of said hydrocarbon feedstock and in which regeneration zone carbon is oxidized at an elevated temperature and thereby removed from the catalyst, the steps comprising bleeding a portion of the metal-contaminated catalyst from the cracking system, contacting bled, substantially carbon-free catalyst for at least about 15 minutes with a gas containing molecular oxygen at a temperature of at least about 1150° F. to 1600° F. to increase subsequent vanadium removal, converting nickel in said oxygen-treated catalyst to a salt dispersible in an aqueous medium, subsequently contacting the catalyst with an aqueous solution having a basic pH and containing ammonium ions sufficient to remove vanadium and nickel from the catalyst and returning resulting demetallized catalyst to the cracking system, said ammonium ions being provided in the aqueous solution by a member selected from the group consisting of ammonium hydroxide, ammonium carbonate and methylamine.

13. The method of claim 12 in which the catalyst is silica-alumina.

14. The method of claim 12 in which the nickel contaminant conversion to a salt includes contact at a temperature above about 300° F. with a gas reactive with the nickel.

15. The method of claim 14 in which the nickel is converted by contact with a sulfiding gas at a temperature of about 800 to 1500° F. followed by conversion of resulting sulfide to water-dispersible form.

16. The method of claim 15 in which the catalyst is silica-alumina.

17. The method of claim 15 in which the sulfiding is performed by contact with $H_2S$.

18. The method of claim 17 in which the catalyst is silica-alumina.

19. The method of claim 17 in which the conversion to water-dispersible form is by contact of the catalyst with an aqueous liquid oxidizing agent.

References Cited by the Examiner

UNITED STATES PATENTS 2,618,613  11/52  Kimberlin et al. _____ 252—412

FOREIGN PATENTS 1,040,723  10/58  Germany.

OTHER REFERENCES

Mellor: "A Comprehensive Treatise on Inorganic and Theoretical Chemistry," Longmans, Green and Co., New York, New York, vol. 2, 1922, page 650.

Mellor: "A Comprehensive Treatise on Inorganic and Theoretical Chemistry," Longmans, Green and Co., New York, New York, vol. 9, 1929, pages 722, 743, 745, 754, 755, and 756.

MAURICE A. BRINDISI, *Primary Examiner.*

JULIUS GREENWALD, *Examiner.*